Sept. 24, 1968           R. F. POTTER           3,402,631

POLARIZED LIGHT REFLECTOMETER

Filed Nov. 16, 1964

ROY F. POTTER
*INVENTOR.*

BY *J. M. St. Amand*

ATTORNEY

United States Patent Office  3,402,631
Patented Sept. 24, 1968

3,402,631
POLARIZED LIGHT REFLECTOMETER
Roy F. Potter, Riverside, Calif., assignor to the United States of America as represented by the Secretary of the Navy
Filed Nov. 16, 1964, Ser. No. 411,648
9 Claims. (Cl. 356—118)

The invention herein described may be manufactured and used by or for the Government of the United States of America for governmental purposes without the payment of any royalties thereon or therefor.

The present invention relates to the measurement of polarized light reflection characteristics of a sample substance, and more particularly to a reflectometer device whose configuration permits merely the sample and mirrors to be moved during the adjustments for various data points rather than the necessity of moving the source, polarizer, detector and the accompanying electrical connections, thus permitting the use of larger and more sophisticated components.

The instant device is a reflectometer for measuring the relative ratio of the reflected intensities of collimated incident radiant energy on an optical specular surface. This ratio is that of $R_{||}/R_\perp$, where $R_{||}$ is the reflection coefficient when the electric vector of the electromagnetic radiation is parallel to the plane of incidence, and $R_\perp$ is the reflection coefficient when the electric vector is perpendicular to the plane of incidence (i.e. polarized $R_{||}$ and perpendicular $R_\perp$ to the plane of incidence). The ratio is to be determined as a function of the angle of incidence $\varphi$ in a rapid and accurate manner over a wide range of values of $\varphi$. Although other angular ranges are useful, one particular range is from $\pi/4 \leq \varphi < \pi/2$. Such data is used in order to determine the optical constants of the specular reflecting sample. Since such constants generally have spectral characteristics, the reflectometer is used in conjunction with a suitable monochromator.

Although reflectometers of this general purpose have been described in the literature, they generally involve the physical movement of either the source or detector element, or both, as well as movement of the sample itself while the incident angle is being changed. This in turn requires that electrical or power connections also move with these elements. In the case of the moving detector this puts a serious requirement on the system if it is detector noise limited. These techniques also limit the measurements to those detectors which can easily be mounted on a moving arm, thus detectors requiring special equipment such as light pipes or cryogenic handling, are excluded, thus limiting the spectral range of application. Most reflectometers described before this have also been limited in the matter of the angle at which they could be used, generally speaking they are limited to a few specified angles. This is especially true if they are to be used in a cryogenic apparatus.

The reflectometer hereinafter described permits the detector to be mounted in a fixed position and external to any cryogenic devices for controlling the sample temperature. This makes it possible to have a variety of detectors suitable for different spectral regions regardless of size, shape, and cooling requirements. This arrangement permits a rapid measurement of $R_{||}/R_\perp$ as a function of the angle of incidence. With no geometrical construction and without reference to prepared graphs and nomographs, the optical constants of opaque materials can be determined with precision and accuracy equivalent or superior to that achieved with previous methods.

It is an object of the invention therefore to provide a new and improved device for measuring the polarized light reflection characteristics of a sample substance.

Another object of the invention is to provide a reflectometer for measuring the relative ratio of the reflected intensities of collimated incident polarized radiation on an optical specular surface.

A further object of the invention is to provide a new and improved reflectometer having no moving electrical connections and fewer moving parts than prior art devices.

Other objects and many of the attendant advantages of this invention will become readily appreciated as the same becomes better understood by reference to the following detailed description when considered in connection with the accompanying drawings wherein.

Referring now to the drawings, like reference characters refer to like parts in each of the figures.

The quantity to be measured is the ratio of $R_{||}/R_\perp$ as a function of the angle of incidence $\varphi$ including the pseudo-Brewster angle $\varphi_B$ which in the instant case is that angle for which $R_{||}/R_\perp$ has a minimum value and which for most air-sample interfaces is at an angle between 45 and 90 degrees. This angle will be reduced for those situations where dielectrics other than air or vacuum in intimate contact with the sample interface are used. The apparatus of the present invention achieves this by rotating the sample $M_S$ about a fixed axis while at the same time keeping the source, polarizer and detector in a fixed position.

Figure 2:
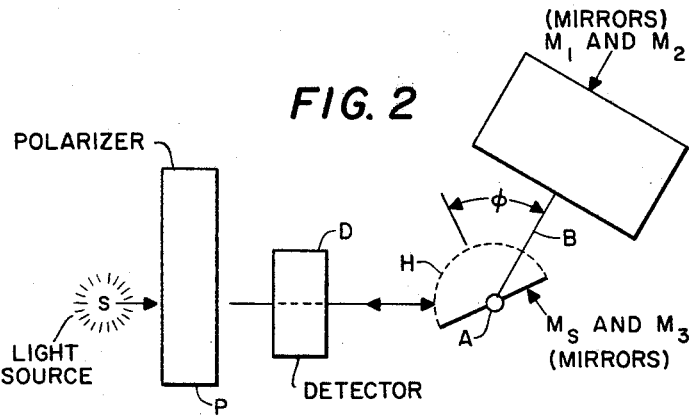
FIG. 2 is a diagrammatic top view of the reflectometer device of FIG. 1.
Figure 3:
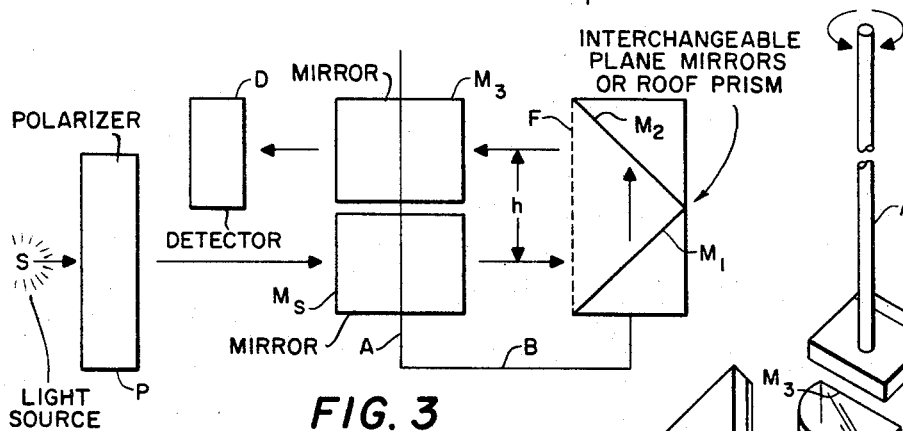
FIG. 3 is a diagrammatic side view of the reflectometer of FIG. 1.
Figure 1:
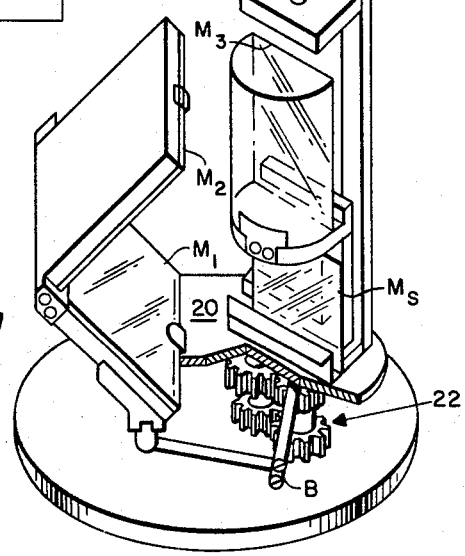
FIG. 1 is a diagrammatic perspective view of an embodiment of the invention.

As illustrated in the drawings, the sample $M_S$ is set on an angle of incidence $\varphi$. The collimated source beam from S passes polarizer P and reflects from sample $M_S$. With respect to the collimated source beam, the reflected beam at the angle of incidence $\varphi$ strikes the mirror $M_1$ at an angle of 45° in the plane of incidence and the beam is in turn reflected to mirror $M_2$ which is mounted 90° to mirror $M_1$ so the light beam again is incident at 45° in the plane of incidence. The image center now strikes the mirror $M_3$ at the angle of incidence $\varphi$ but is displaced vertically by the distance $h$. The beam is again reflected from mirror $M_3$ at the angle $\varphi$ after which it is collected and placed on the detector D. The mirror system $M_1M_2$ is placed on a rotating arm B that is geared to the shaft A in a 2-to-1 ratio by a system of gears 22. The linkage between A and B can take several mechanical forms. The principal criterion is that the surface F, FIG. 3, be always normal to the reflected beam. The arm B moves through an angular distance at twice the angular rate that the sample is rotated about the axis of shaft A. Thus at an angle of incidence of 45°, $\pi/4$, the system $M_1M_2$ is perpendicular to the incident beam; at an angle of incidence of 90°, $\pi/2$, the system $M_1M_2$ is parallel to the beam. The collimated source is external to the apparatus as is the polarizer P. Polarizer P is any polarizer which is suitable for the spectral region being examined as is the fixed detector B. In FIG. 1 is shown a cut-away view of the gear and lever system which moves the mirror system $M_1M_2$ about the axis A in a 2-to-1 ratio movement. The present apparatus permits an almost unlimited selection of detectors for distinct spectral regions and sensitivity requirements.

If metallic mirrors are used at $M_1$ and $M_2$, some polarization will be introduced at certain portions of the spectral region at wavelengths short of $5\mu$, depending upon the metal used. This is in addition to whatever polarization has been introduced in the beam by the monochromator. Although the angular incidence on the sample changes, the polarization at each wavelength is constant because the angle of incidence on the mirrors $M_1$ and $M_2$ is always 45 deg. Since one must calibrate and determine the amount of polarization from the monochromator, the effect of mirrors $M_1$ and $M_2$ can be determined at the same time. Even this requirement can be removed if one uses a 90-deg. roof prism that is made of a material with a refractive index such that the critical angle for total internal reflection is less than 45 deg. in the spectral region of interest. When using such a prism, its hypotenuse face is mounted so that it is always perpendicular to the reflected beam; that is, the angle of incidence on the roof prism face is zero. No polarization is introduced in the beam, because when the beam strikes the roof, there exists a 45-deg. angle of incidence and both polarizations, which are totally internally reflected from the surface $M_1$ to the surface $M_2$, exit at zero angle of incidence from the hypotenuse face of the prism.

The mirror $M_3$ presents a somewhat different problem. In the spectral regions where metallic mirrors are expected to show a great deal of dispersion effect, a hemicylinder prism H is used, as shown in FIG. 1, with the flat surface of the hemicylinder serving as $M_3$. The collimated beam from $M_2$ strikes the cylindrical surface at an angle of incidence very near zero. Again, the refractive index of the hemicylinder is such that the rays which strike the flat surface $M_3$ are at angles of incidence greater than the critical angle and both polarized beams are totally internally reflected, exiting from the hemicylinder at either zero or very small angles of incidence $\varphi$. In this manner, any polarization effects that might be introduced when a flat, metallic mirror is used at $M_3$ are eliminated, or at least minimized to such a degree that they can be considered negligible. In certain cases where the minimum of the ratio $R_{||}/R_\perp$ is not very pronounced, the mirror $M_3$ can be replaced with a second sample of the material to be studied. For data reduction, the samples are considered to be identical. In actual apparatus, prism materials of quartz and KRS5 have been used for hemicylinders and tank prisms.

The gear system 22 that controls the motion of arm B relative to that of axis A does not have stringent requirements; however, the gears and vernier readouts necessary for measuring the amount of rotation about the axis A can have a wide range, depending upon the accuracy required.

Sheet polarizers from the Polaroid Corporation are used at P for the region from 400 to 2000 m$\mu$. Stacked silver chloride sheets have been made into a polarizer to be used in the same mount at P for measurements out to 20$\mu$. The entire assembly—consisting of the axis A with sample S, the arm B, and the mirrors $M_1$, $M_2$, and $M_3$—has been mounted in a cryogenic apparatus with a single fixed window through which the light enters and exits at zero angle of incidence, permitting the sample to be cooled to temperatures near 77° K. but can be used at any temperature.

By means of the instant invention, the ratio $R_{||}/R_\perp$ can be determnied quickly and accurately at $\varphi=\pi/4$ and at $\varphi \leq \varphi_B \leq \varphi$ which permits a determination of the optical constants for the specular sample at the wavelength of the incident radiation with mirrors $M_1$, $M_2$ and $M_3$ at A eliminate all the requirements of moving electrical connections. Because the source and detector are fixed, this invention permits the use of complicated, sophisticated, and physically cumbersome detectors external to the apparatus. One window for incident and exiting beams can be used and mounted at normal incidence. In certain applications the exit window can be replaced with an internally mounted fixed detector. The mirrors $M_1$ and $M_2$ can be flat metallized mirrors or a roof prism having suitable transmission characteristics which has a suitable index of refraction such that at an angle of incidence of $\pi/4$, total internal reflection takes place and no polarization of the beam is introduced. This is not completely necessary because such polarization is constant and in as much as the light is normally incident on the hypotenuse face F, FIG. 3, such polarization would be constant and could be included in the determination of the polarization present in the incident beam.

However in the $\mu$v., visible and near infrared spectral regions metallic mirrors exhibit strong polarization effects hence in those regions it is extremely desirable to replace $M_3$ with a hemicylinder of the proper optical characteristics such that the beam from $M_2$ strikes the surface H at normal incidence for all values of $\varphi$ and at sufficiently large values that total internal reflection takes place at the surface $M_3$ thus eliminating or minimizing undesirable polarization from $M_3$. In some instances it is desirable to make $M_S$ and $M_3$ of the same materials, thus one measures $(R_{||}/R_\perp)^2$, which improves the accuracy and sensitivity of the measurements when $R_{||}/R_\perp \gtrsim \frac{1}{5}$. For wavelengths $\lambda > 5.0$ microns $M_3$ can be a flat aluminum mirror with minor corrections in polarization. A KRS5 or AgCl hemicylinder can be used to eliminate even this. A hemicylinder of known optical characteristics can also be placed at $M_S$ (or $M_3$) with an unknown material in intimate contact with the flat surface. By measuring $R_{||}/R_\perp$ as a function of $\varphi$ an analysis can be made of the unknown optical constants of that material. This would be especially useful for determining the optical constants of highly absorbing liquids, including water and other chemical fluids.

Obviously many modifications and variations of the present invention are possible in the light of the above teachings. It is therefore to be understood that within the scope of the appended claims the invention may be practiced otherwise than as specifically described.

What is claimed is:

1. A reflectometer for measuring the ratio of reflectances of beams of radiant energy from optical specular surfaces linearly polarized parallel and perpendicular to the plane of incidence, comprising:
    (a) a fixed source of radiant energy for providing a collimated beam of light,
    (b) a fixed polarizing means,
    (c) a fixed detector means,
    (d) first and second rotating means whose axes of rotation are parallel to each other,
    (e) first, second and third mirrors,
    (f) said first and second mirrors mounted on said first rotating means each at an angle of 45 degrees with the axis of rotation of said first rotating means and at 90 degrees to each other,
    (g) a sample material whose optical constant is to be determined and said third mirror being mounted in the same plane on said second rotating means for rotation about the axis of rotation,
    (h) means linking said first and second rotating means for simultaneously rotating said first and second mirrors on said first rotating means at twice the angular rate as said sample and third mirror are rotated on said second rotating means,
    (i) said sample being set at an angle of incidence with respect to a beam of radiant energy from said fixed source such that the radiant energy beam reflected from the sample at an angle equal to said angle of incidence strikes said first mirror at an angle of 45 degrees measured in a plane perpendicular to the plane of incidence to and reflectance from said sample, is in turn reflected to said second mirror and reflected therefrom at 45 degrees to a plane parallel to the plane of incidence to and reflectance from said sample to strike said third mirror at an angle equal to said angle of incidence, and then reflected from said third mirror to said fixed detector means,
    (j) said first and second mirrors always being normal to the plane defined by the beam reflected from said sample and the beam reflected to said third mirror,
    (k) at an angle of incidence of $\pi/4$ the mirror system formed by said first and second mirrors being perpendicular to the incident beam, and at an angle of incidence of $\pi/2$ the mirror system formed by said first and second mirrors being parallel to the beam, wherein the pseudo-Brewster angle of incidence is determined with great accuracy and the ratio, of the reflection coefficient when the electric vector of the radiant energy is parallel to the plane of incidence to the reflection coefficient when the electric vector of the radiant energy is perpendicular to the plane of incidence, is determined at the minimum value.

2. A device as in claim 1 wherein said first, second and third mirrors are flat metallized mirrors.

3. A device as in claim 1 wherein said first and second mirrors comprise roof prism having an index of refraction such that at an angle of incidence of $\pi/4$ total internal reflection takes place and no polarization of the beam is introduced.

4. A device as in claim 1 wherein said fixed detector is mounted external to any cryogenic devices for controlling sample temperature.

5. A device as in claim 1 wherein a hemicylinder prism with the flat surface serving as said third mirror is used to eliminate any polarization effect that might be caused by a flat metallic mirror.

6. A device as in claim 1 wherein said third mirror is replaced with a second sample of the material to be studied.

7. A device as in claim 1 wherein stacked silver chloride sheets are used as the polarizer means.

8. A device as in claim 1 wherein sheet Polaroid polarizers are used as the polarized means.

9. A device as in claim 1 wherein the reflected beam is displaced the distance between the center of said first mirror and the center of said second mirror.

No references cited.

JEWELL H. PEDERSEN, *Primary Examiner.*

A. A. KASHINSKI, *Assistant Examiner.*